United States Patent
Totzke

(10) Patent No.: US 9,025,596 B2
(45) Date of Patent: May 5, 2015

(54) HEAD OFFICE AND PLURALITY OF BRANCHES CONNECTED VIA A NETWORK

(75) Inventor: Jürgen Totzke, Poing (DE)

(73) Assignee: Unify GmbH & Co. KG, Munich (DE)

( * ) Notice: Subject to any disclaimer, the term of this patent is extended or adjusted under 35 U.S.C. 154(b) by 2234 days.

(21) Appl. No.: 11/632,268

(22) PCT Filed: Jun. 29, 2005

(86) PCT No.: PCT/EP2005/007070
§ 371 (c)(1),
(2), (4) Date: Jan. 11, 2007

(87) PCT Pub. No.: WO2006/005447
PCT Pub. Date: Jan. 19, 2006

(65) Prior Publication Data
US 2007/0201455 A1    Aug. 30, 2007

(30) Foreign Application Priority Data
Jul. 15, 2004  (GB) .................................. 0415841.6

(51) Int. Cl.
*H04L 12/46* (2006.01)
*H04L 29/06* (2006.01)

(52) U.S. Cl.
CPC ............ *H04L 12/4633* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 6,880,090 B1 * | 4/2005 | Shawcross | 726/14 |
| 7,002,993 B1 * | 2/2006 | Mohaban et al. | 370/471 |
| 7,299,301 B1 * | 11/2007 | Verma et al. | 709/249 |
| 7,359,974 B1 * | 4/2008 | Quinn et al. | 709/228 |
| 2002/0013844 A1 | 1/2002 | Garrett et al. | |
| 2002/0071438 A1 * | 6/2002 | Singh | 370/398 |
| 2003/0005147 A1 * | 1/2003 | Enns et al. | 709/238 |
| 2003/0039234 A1 * | 2/2003 | Sharma et al. | 370/338 |
| 2003/0112808 A1 * | 6/2003 | Solomon | 370/400 |
| 2003/0115359 A1 | 6/2003 | Ishibashi et al. | |
| 2003/0165138 A1 * | 9/2003 | Swonk et al. | 370/392 |
| 2004/0001508 A1 * | 1/2004 | Zheng et al. | 370/466 |

FOREIGN PATENT DOCUMENTS

WO    WO 02/078283 A2    10/2002
WO    WO 2004/004277 A1    1/2004

* cited by examiner

*Primary Examiner* — Marcus R Smith
(74) *Attorney, Agent, or Firm* — Buchanan Ingersoll & Rooney PC

(57) ABSTRACT

In one aspect, a method of sending traffic in a telecommunications network is provided. The telecommunications network includes a first branch network, a second branch network, intermediate system, and a head office network having a server. The first and second branch networks communicatively connected to the head network via the intermediate system. Traffic for the second branch network is received at a first branch network. The traffic at the first branch network is modified such that the intermediate network forwards the traffic to the head network. The intermediate network recognizes that the traffic is for the second branch network. The traffic is received at the head network, and the traffic is modified at the head network such that the intermediate network forwards the traffic to the second branch network.

20 Claims, 3 Drawing Sheets

HEAD OFFICE AND PLURALITY OF BRANCHES CONNECTED VIA A NETWORK

CROSS REFERENCE TO RELATED APPLICATIONS

This application is the US National Stage of International Application No. PCT/EP2005/007070, filed Jun. 29, 2005 and claims the benefit thereof. The International Application claims the benefits of Great Britain application No. 0415841.6 GB filed Jul. 15, 2004, both of the applications are incorporated by reference herein in their entirety.

FIELD OF INVENTION

The present invention relates to a head office and plurality of branches connected via a network.

SUMMARY OF INVENTION

Corporate networks for data communication are often used in the form of headquarters and branch network configurations. These types of corporate networks must increasingly satisfy real-time requirements. In contrast to local networks branch networks are often linked to the headquarters using wide area networks (WANs). For these networks service level agreements (SLAs) are negotiated between corporate network operators and public network operators. SLAs typically include the bandwidth provided, possible class service available and billing agreement. Depending on the scope and level of the quality of service (QoS), thus, WAN links become available resources to be used where possible in the most cost-efficient manner for the network services to be provided. Often the SLA is subject to ongoing monitoring so that the public operators does not charge unjustifiably high tariffs for actual service delivered.

Access routers located at the border of the WAN are used to route and connect entities such as branched office networks to a WAN using appropriate interfaces and utilizing the classes of service offered by the public network operator. If these routers are also in charge of identifying, differentiating, and prioritizing the actual traffic in real-time, they come up against technical performance limits, since they are optimized for buffering and forwarding IP packets, i.e. they operate up to e.g. layer 3 of the ISO seven layer model (i.e. physical layer link layer and network layer only). What is needed however is a recognition of protocols up to layer 7 (to encode e.g. header, TCP FTP HTPP and ERP levels) and to enable a distinction to be made between packets of different flows of individual applications and in order to be able to sensibly assign these applications to an agreed class-of-service. These types of router are also very costly and often do not even meet the requirements for monitoring SLAs and the traffic occurring in corporate networks as a planning basis. This is why supplementary, highly specific niche products have found their way into these corporate network configurations supplementing access router products with the given functions. In other words these products are known as quality of service and traffic management network devices which supplement so as to identify specific extra layers. In such configurations these devices will be connected between at the local network and immediately before the access router. Such devices mostly have comprehensive monitoring and statistics functions as well as graphical user interfaces which allow corporate network operators to operate them in an intuitive way. These products recognize the various network services of typical corporate networks, prioritize these, suppress none-critical data flows and thereby use the costly wide area network in a most efficient manner.

Unfortunately there is also an unresolved problem with such devices that occurs as soon as the branches transfer data packets to each other, i.e. to other branches. This is also referred to as the "Hub & Spoke" problem. This occurs primarily with peer-to-peer applications communicating branch to branch such as the VoIP application, video conferencing etc. This is discussed below.

For most client-server based applications deployed in headquarter and branch office scenarios, the servers are located for operational reasons in the head office. The problem with cross network traffic (i.e. traffic/data which is to go from branch to branch) is caused by such traffic being routed by the access routers or the routers in the WAN without it being able to be recorded before hand e.g. for applied traffic management functions by the quality of service management device located at the head office. This also would sometimes allocate a particular bandwidth. This means that the quality of service characteristics of other traffic can be disturbed on the receiver side in the branches. In other words it is important that head office manages all traffic including branch to branch traffic, but currently networks such as WAN have autonomous routers which work independently and will route without knowledge in the head office and thus nothing is recorded.

One possible solution is already being realized in a number of quality of service management network devices by using logical links which are configured on top of the physical access link to the WAN in the headquarter destined to each of the different branch offices. A disadvantage of this solution is the associated segmentation of the physical link and thereby under some circumstances the associated waste of resources as well as the bad scalability properties of this solution.

It is an object of the invention to provide a method to overcome all of the above disadvantages and such that all traffic is monitored by the head office.

BRIEF DESCRIPTION OF THE DRAWINGS

The invention will be descried with reference to the following figures of which.

DETAILED DESCRIPTION OF INVENTION

Figure 1:
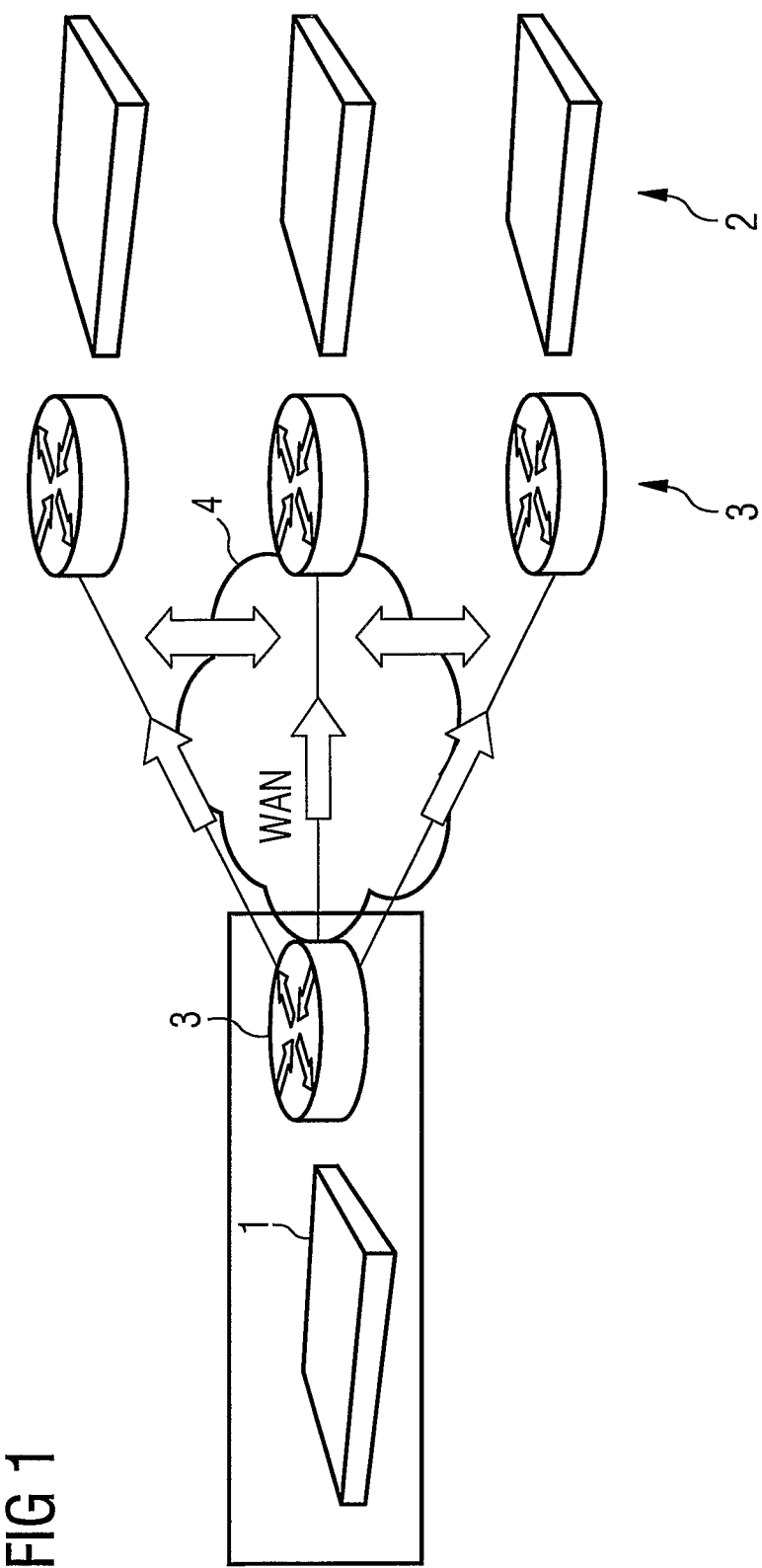
FIG. 1 shows a general view of a head office and a plurality of branches.

FIG. 1 shows a typical head office and branch network configuration with a head office (Z) and three branches (A, B, C). Various IP sub-networks of the LAN are connected via a Wide Area Network (WAN) via the quality of service network management devices.

The quality of service management network devices at the branch networks differentiate their communication partners in accordance with head offices and branches. When cross-network traffic occurs the branch device recognizes they are destined for another branch office, it encapsulates the data (e.g. IP packets) before transmitting them into a container IP packet which is addressed with the IP destination address of entity located at the head network. This is usually to a software station of the central device/server in the head network. This is referred to as "tunneling" which effectively creates a virtual address. In other words due to the particular manipulation of outgoing traffic from a branch the WAN will not recognize recognise the data as being destined for another branch, but will see it as destined for the head office.

In order to reduce the additional tunneling overhead, the packet header is preferably compressed for longer-duration connections. This can be undertaken at various levels, e.g. IP-, UDP/TCP, RTP "Header Compression".

If the maximum transfer size of the packet is exceeded the packet must in any event be segmented beforehand. The WAN (intermediate network) transfers these tunnels packets to the head office instead of to the originally addressed partner branches. On the receiver side at the head office device these tunneled packets are terminated by a software station. Here the tunneling container, i.e. the virtual address to which the packet is sent, is removed, and if compressed the header will be decompressed. The packet/traffic and the packet is included in LAN-side traffic before handling, i.e. classification and prioritization. This means that the packets finally reach their intended destination in the partner branches. The advantage is that cross-network traffic is also recorded and handled in the head offices and that this is done without expensive administration. The bandwidth requirement in the branches is not increased. However the bandwidth requirement in the head offices increases by the amount of the cross-traffic and the devices in the head offices must provide a correspondingly more powerful performance. A comprehensive and contemporary solution of the Hub & Spoke problem is therefore specified in accordance with the invention.

Figure 2:
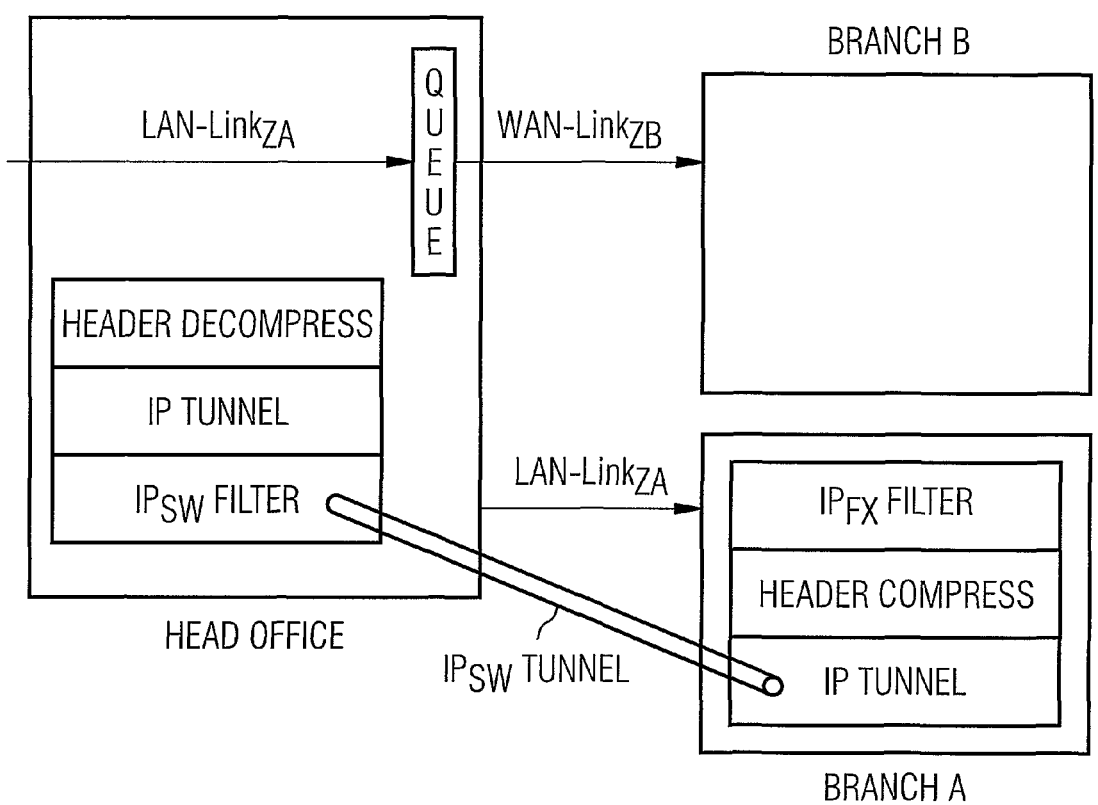
FIG. 2 shows the functional units of a head office system and a branch system utilized in a preferred embodiment of the invention.

FIG. 2 shows more detail of the functional units. The head office implements a software station which can be addressed via a specific IP address ($IP_{sw}$). The branch office equipment (A,B,C) know this IP address. The software station at head office implements the following functional units: $IP_{sw}$ filter, IP tunnel and optional protocol detection with the corresponding header decompression. The branch equipment classifies the incoming traffic from the branches and additionally detects whether the original addressee is in the branch office of the head office ($IP_{fx}$ filter) If the destination is in another branch office and (if a time-critical traffic class is involved) the packet will be tunneled be (IP tunnel). Optionally, beforehand, (if a VoIP packet is involved for example), RTP header compression is undertaken at the originating branch. Then the tunnel packet is sent to the head office. Here the packets for the software station are sorted (IP.sub.sw filter) and assigned to the software station where first the additional IP header added by the originating branch (i.e. of the container (IP tunnel)) is removed and the original header of the packet reconstructed for header decompression. Thereafter the reconstructed packets are re-issued into the LAN-side data flow and are thus handled and evaluated in the same way for classification and prioritization.

Figure 3:
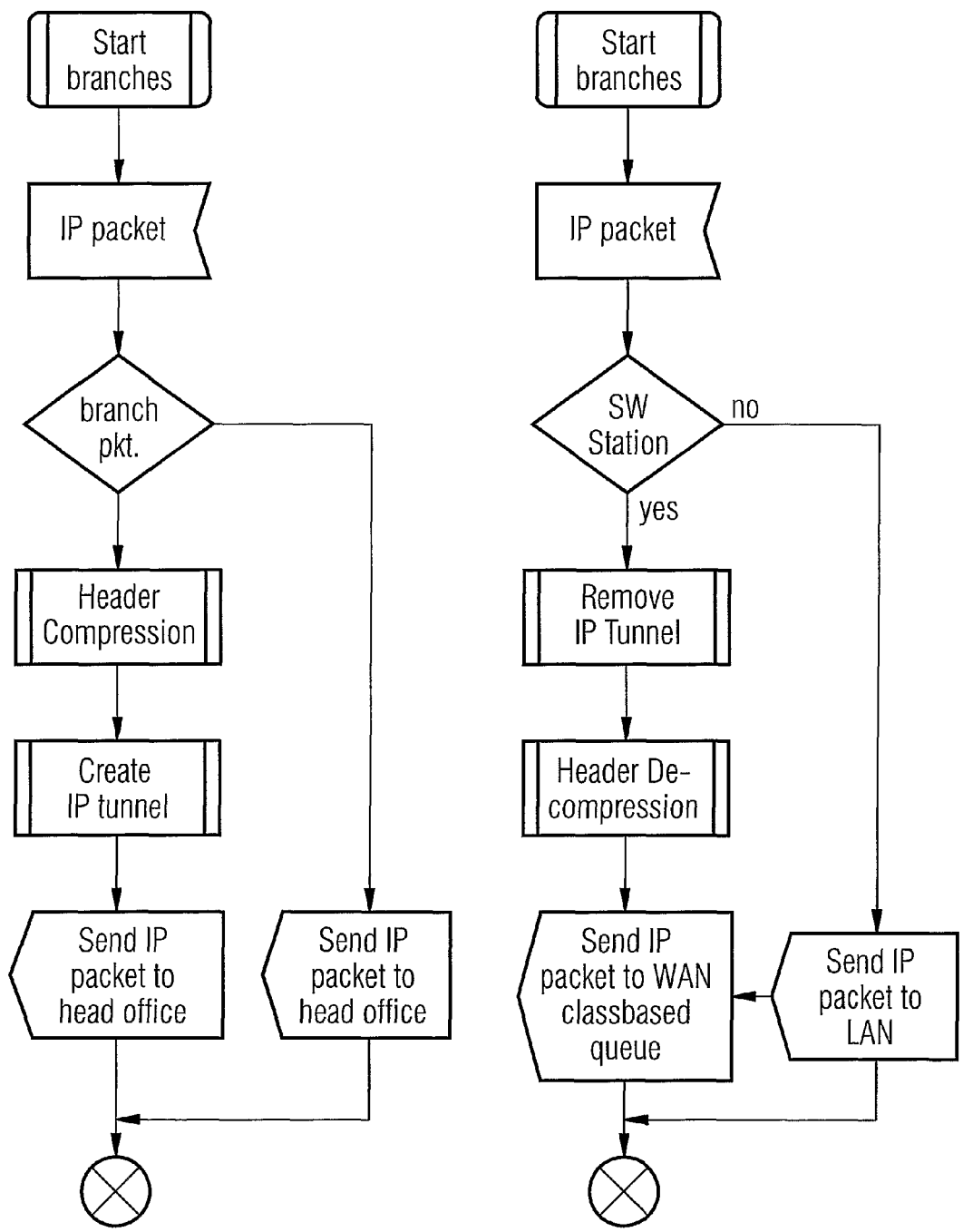
FIG. 3 shows a flow diagram representing the steps according to a method of a preferred embodiment of the invention.

FIGS. 3a and b respectively show flow diagrams of the steps taken at the branch and head office As mentioned it is preferred to reduce the additional tunneling overhead the packet header should be compressed for longer transmissions. This can be done at different levels, e.g. IP, UDP/TCP, RTP header compression.

In order to reduce the additional effort in the central equipment and for the bandwidth requirement of the head office, tunneling should be restricted to critical traffic classes such as VoIP cross traffic. No-time-critical cross traffic of lower-priority traffic classes can travel directly between the branches, since as a rule there are no or very low class-of-service requirements here.

The traffic between branches and head office itself should be transmitted normally and not tunneled.

The invention claimed is:

1. A method of sending traffic comprised of data in a telecommunications network from a first branch network to a second branch network, the telecommunications network comprised of a main office network and a plurality of branch networks, the branch networks and the main office network connected via an intermediate network, the plurality of branch networks comprised of the first branch network and the second branch network, the method comprising:
    differentiating whether the traffic is destined for the main office network or the second branch network at the first branch network;
    modifying the traffic destined for the second branch network such that the intermediate network recognizes that modified traffic as being destined for the main office network so that modified traffic is transferred to the main office network;
    receiving the modified traffic by the main office network;
    recognizing the modified traffic as being destined for the second branch network and altering the modified traffic such that the altered modified traffic is recognizable by the intermediate network as being destined for the second branch network; and
    forwarding the altered modified traffic to the second branch network.

2. The method of claim the 1, wherein the modification of the traffic at the first branch network comprises encapsulating the traffic into a data packet that is comprised of a new header so as to forward the data packet to the main office.

3. The method of claim the 2, wherein the modification of the traffic at the first branch network comprises adding a new IP address.

4. The method of claim the 3, wherein the recognition of the modified traffic as being destined for the second branch network is performed by the main office network recognizing the encapsulation.

5. The method of claim the 4, wherein the altering of the traffic occurs at the main office network, the altering comprising decapsulating the header.

6. The method of claim the 5, wherein the traffic is also recorded at the main office network.

7. The method of claim the 5, wherein the traffic is managed at the main office network.

8. The method of claim the 5, wherein the modifying of the traffic at the first branch network includes compressing a header.

9. The method of claim the 7, wherein the header is decompressed at the main office network.

10. The method of claim the 1, wherein the traffic modified at the first branch network is comprised of a header that is compressed.

11. The method of claim the 10, wherein the header is decompressed at the main office network.

12. The method of claim the 1, wherein the intermediate network is a WAN.

13. The method of claim the 1, wherein the traffic is recorded at the main office network.

14. The method of claim 1 wherein the recognizing the modified traffic as being destined for the second branch network and altering the modified traffic such that the altered modified traffic is recognizable by the intermediate network is performed by at least one device of the main office network and the forwarding of the altered modified traffic to the second branch network is performed by at least one device of the main office network.

15. The method of claim 14 wherein the main office network has at least one server and the at least one server is the at least one device of the main office network that performs the forwarding of the altered modified traffic and also performs the recognizing of the modified traffic as being destined for the second branch network and the altering of the modified traffic such that the altered modified traffic is recognizable by the intermediate network.

16. The method of claim 1 wherein the main office network performs the recognizing of the modified traffic as being destined for the second branch network and altering the modified traffic and alters the modified traffic such that the altered modified traffic is recognizable by the intermediate network as being destined for the second branch network.

17. A system configured for sending traffic comprised of data in a telecommunications network from a first branch network to a second branch network, the system comprising:
   a main office network;
   a plurality of branch networks, the plurality of branch networks comprised of the first branch network and the second branch network, the branch networks configured to communicate with the main office network via at least one intermediate network;
   the first branch network configured to differentiate whether the traffic is destined for a main office network or the second branch network at the first branch network and modify the traffic destined for the second branch network such that the at least one intermediate network recognizes that traffic as being destined for the main office network;
   the main office network configured to recognize the modified traffic as being destined for the second branch network and also configured to alter the modified traffic such that the altered modified traffic is recognizable by the at least one intermediate network as being directed to the second branch network, the main office network also configured to forward the altered modified traffic to the second branch network.

18. The system of claim 16 wherein the modification of the traffic preformed by the first branch network comprises encapsulating the traffic into a data packet that has a header configured to divert the data packet to the main office network.

19. The system of claim 17 wherein the main office network is comprised of at least one server configured to recognize the modified traffic as being destined for the second branch network and also configured to alter the modified traffic such that the altered modified traffic is recognizable by the intermediate network as being destined for the second branch network.

20. The system of claim 19 wherein the at least one server is also configured to manage the traffic and record the traffic.

* * * * *